Jan. 5, 1926. Re. 16,241
S. S. WILSON
APPARATUS FOR MANUFACTURING SHEETS AND OTHER ARTICLES FROM PLASTIC MATERIALS
Original Filed Dec. 7, 1923
Fig. 1.
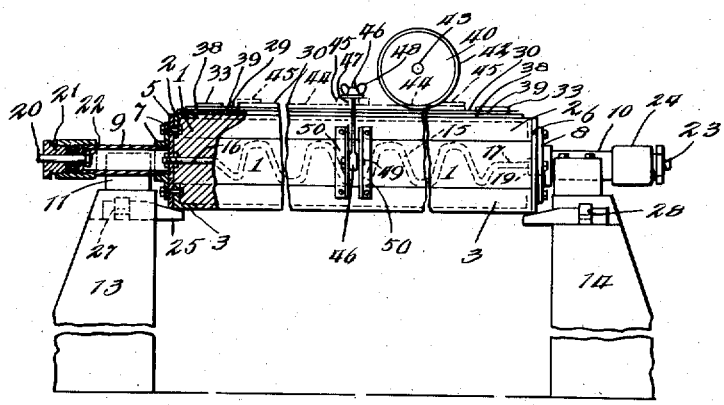
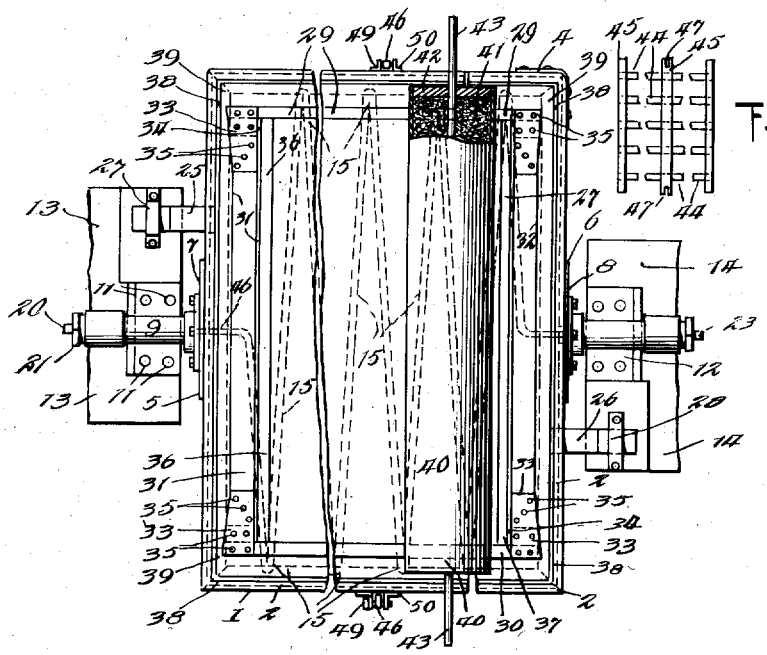
Fig. 3.
Fig. 2.
INVENTOR
Samuel Scott Wilson
BY
William B. Davis
ATTORNEY Reissued Jan. 5, 1926.

Re. 16,241

UNITED STATES PATENT OFFICE.

SAMUEL SCOTT WILSON, OF MEYERTON, TRANSVAAL, SOUTH AFRICA.

APPARATUS FOR MANUFACTURING SHEETS AND OTHER ARTICLES FROM PLASTIC MATERIALS.

Original No. 1,520,791, dated December 30, 1924, Serial No. 679,248, filed December 7, 1923. Application for reissue filed August 7, 1925. Serial No. 48,905.

*To all whom it may concern:*

Be it known that I, SAMUEL SCOTT WILSON, a subject of the King of Great Britain, and resident of Meyerton, Transvaal Province, Union of South Africa, have invented a certain new and useful Improvement in Apparatus for Manufacturing Sheets and Other Articles from Plastic Materials, of which the following is a specification.

This invention relates to the manufacture of sheets, tiles, and the like applicable for building and other similar purposes, which are made from plastic cementitious mixtures or materials such as asbestos and cement, or from a cementitious mixture in which the asbestos is the principal constituent by bulk or volume.

Although primarily designed for the manufacture of sheets and like flat products, the invention can also be adapted to the manufacture or production of articles or products of other shape or configuration from such materials.

In one method of manufacturing sheets, etcetera, from a mixture of asbestos, Portland cement and water, the mixture is spread on a table, slab or mould made from material which has a high absorptive capacity for water, such as plaster of Paris.

The present improvements appertain to an apparatus in which such a slab, table or mould is employed, and have for one object to combine therewith heating means which will facilitate the process of manufacture by ensuring a quicker drying of the material after it has been spread or applied to the surface of the slab, table or mould. Another object is to prevent the cement or equivalent ingredient of the mixture from coming directly into contact with the surface of the porous slab, table or mould, so as to maintain the maximum absorptive capacity. A further object is to construct the apparatus in such a way that the slab, etcetera, can be used practically continuously, by utilizing both sides thereof, and to that end providing means whereby it can be readily inverted. A still further object is to construct and arrange the various parts of the apparatus to simplify and facilitate production and thereby reduce the cost of manufacture of the sheets, etcetera, with the aid thereof.

As a result of the rapid formation and drying of the sheets, etcetera, a mixture containing a higher percentage of asbestos can be used than with the existing slabs and in that way a lighter sheet can be made.

The invention will be more particularly explained in connection with the accompanying drawings, wherein—

Fig. 1 is a part-sectional side elevation of the apparatus designed for use in the production of sheets.

Fig. 2 is a part-sectional plan of the same, and

Fig. 3 is a plan view, drawn to a reduced scale, of the carrier and support for retaining the sheet on the slab or the like while the latter is being inverted, and for subsequently removing it therefrom.

In the drawings the numeral 1 denotes the slab, table or mould which is made of plaster of Paris, or other similar material or mixture of high absorptive capacity for water. The slab, etcetera, 1 is made of appropriate dimensions and is carried in a metal framework shown comprising the two rectangular angle iron frames 2, 3, the ends of which are each connected by means of a strap or plate 4—see Fig. 2. To the frame 2, 3, at opposite sides thereof, are bolted or otherwise suitably fixed plates 5, 6, to which, in turn, the flanges 7, 8, are attached. Into each of the flanges or sockets 7, 8, there is screwed or otherwise suitably fixed a tubular member, 9, 10, respectively, which serves as hollow trunnions by which the slab, etcetera, is rotatably supported; 11, 12, being the bearings in which the trunnions are journalled, and 13, 14, the pedestals or foundations upon which the bearings 11, 12 are arranged at a suitable working height.

For the purpose of heating the slab, etcetera, a pipe 15, shaped into the form of a flattened coil or a double zig-zag structure is embedded therein, and one end, 16, of the pipe 15, opens into the one hollow trunnion 9, whilst the other, 17, opens into the other hollow trunnion 10. The ends 16, 17, of the pipe 15 may be fixed in the plates 5, 6, respectively, by the nuts 18, 19. The hollow trunnion 9 may serve as the inlet to the flattened coil 15 and the other hollow trunnion 10 serve as the outlet. The steam or hot fluid supply pipe 20 passes through a stuffing box and gland 21 into the hollow trunnion 9; 22 being a nut for preventing withdrawal of the pipe 20. 23 is the outlet pipe from the flattened coil 15 which pipe 23 passes through a gland 24 arranged at the outer end of the hollow trunnion 10, the gland 24 being of the same construction as gland 21.

In order to support and steady the slab, etcetera, 1 in its normal horizontal position, which is the position in which it is placed when forming a sheet, etcetera, thereon, movable wedge-shaped rests or stops 25, 26, placed at opposite sides of the slab, are provided. These rests 25, 26, are shown arranged in guides 27, 28, fixed on the foundations 13, 14, at opposite sides of the bearings 11, 12. The rests or stops 25, 26, are withdrawn from their guides 27, 28, when it is desired to invert the slab, etcetera, 1, as hereinafter explained.

In order to impart the desired shape to the sheet, etcetera, and determine its thickness, a loose removable metal frame is employed, which is made of a size and shape to correspond to the sheet, etcetera, to be formed upon the slab, etcetera, 1. This frame is shown comprising two rigid side members 29, 30, and two thinner and flexible end members 31, 32, which members are shown connected together at the corners by means of plates 33 riveted to the members 29, 30, 31, 32. Between the members 29, 30, and 31, 32, at the corners of the frame, there are placed small pieces 34 which are of the same thickness as the members 29, 30. 35 are the rivets fixing plates 33 to the various members 29, 30, 31, 32, 34 of the frame.

Separate removable rigid members 46, 47 are shown placed at the ends of the frame, parallel to the members 31, 32 and next the inner ends of the small pieces 34, so that said pieces 34 serve as stops for the members 36, 37 in the direction of the ends of the frame. The thickness of the members 29, 30, and 36, 37, determines the thickness of the sheet, etcetera, which is made in the frame, and the size of the sheet, etcetera, is equal to the area of the space enclosed between the inner edges of said members. This construction of the frame facilitates the operation of removing the frame after the sheet, etcetera, has been formed, and the subsequent removal of the sheet from the slab or table.

The upper surface of the slab or table 1 is completely covered with a piece of jute canvas 36, or other suitable canvas or woven material of a suitable texture, and upon said canvas covering 38, there is preferably laid a sheet of paper 39 or other suitable material which, while readily admitting of the passage through it of water, will prevent the passage through it of the fine solid material or the cement of the mixture. The frame in which the sheet, etcetera, is made or moulded is placed directly upon the paper covering 39. Alternatively, the paper 39 may be dispensed with and the table 1 covered with a piece of coarse woven fabric, such as hessian, to which a thin layer of a mixture of French chalk and plaster of Paris is applied, the piece of jute canvas or the like being placed upon said hessian or the like.

The material from which the sheet is to be made is more or less roughly spread upon the surface of the paper 39, inside the frame, and it is then formed into an even layer or thickness by suitable means, as for example, by means of a suitable heavy roller 40, comprising an outer metal pipe or tube filled with concrete or other suitable weighty material 41, and closed at the ends with cover plates 42. The roller is provided with a central rod 43 which serves as a handle at each end projecting beyond the sides of the frame of the slab or table. The roller near its ends rests and rolls on the members 29, 30 of the frame.

After the material has been roughly spread on the slab or table, it is rolled level by moving the roller 40 backwards and forwards, any surplus material being thereby worked to the ends of the frame from which it can be removed in any suitable manner, as for example, by means of a trowel or the like.

After the sheet has been formed, the frame comprising the members 29, 30, 31, 32, is removed, and the separate or loose members 36, 37, are then taken away. The formed sheet is now secured on the surface of the slab or table by means of a carrier and support shown—see Figs. 1 and 3—constructed of a suitable number of parallel members or slats 44 connected together by a suitable number of other members 45 placed at right angles thereto. Means are provided for attaching this support and carrier to the sides of the frame of the slab or table, and for this purpose each of said sides has hingedly attached to it an eyebolt 46, which are adapted to engage in the bifurcated ends 47, of the central parallel member 45; 48 are wing nuts on the ends of the eye bolts 46 for clamping the carrier in position over the sheet. When the slab or table is inverted the sheet lies upon the carrier and support so that the latter serves as a convenient vehicle for transporting it to any desired place. The loosening of the wing nuts 48 allows the eyebolts 46 to be disengaged from the bifurcated ends 47 of the central parallel member 45, which permits the carrier, together with the sheet, to be lowered and removed.

The eyebolts 46 are pivotally mounted on pins 49 which are carried between two angle iron pieces 50 fixed to the angle iron members 2, 3 of the frame. The pins 49 are placed centrally of the depth of the table or slab 1, so that the eyebolts 46 can be used for fixing the carrier and support on either face of the slab or table. By attaching the angle iron pieces 50 to the members 2, 3, they serve to stiffen and strengthen the framework carrying the slab or table.

What I claim as my invention and desire to protect by Letters Patent is:—

1. An apparatus of the nature indicated, including a table of absorbent material, and heating means embedded in said table.

2. An apparatus of the nature indicated, including a table of absorbent material, and heating means in the form of a flattened coil embedded in said table.

3. An apparatus of the nature indicated, including a table of absorbent material, said table being adapted to be rotated in order to invert it.

4. An apparatus of the nature indicated, including a table of absorbent material, said table being adapted to be rotated in order to invert it, and removable rests for retaining the table in its horizontal or working position.

5. An apparatus of the nature indicated, including an absorptive table, and heating means embedded in said table, said table being adapted to be rotated in order to invert it.

6. An apparatus of the nature indicated, including an absorptive table, said table being adapted to be rotated in order to invert it, the means for permitting of the table being inverted comprising trunnions provided at opposite sides of the table and bearings for said trunnions, and heating means embedded in the table.

7. An apparatus of the nature indicated, including a table of absorbent material, heating means in the form of a flattened coil embeded in said table, means for permitting of the table being inverted, said means comprising trunnions provided at opposite sides of the table and bearings for said trunnions, the trunnions being of hollow construction and communicating with the flattened coil, and means for introducing the heating medium into one trunnion and for withdrawing said medium from the other trunnion.

8. An apparatus of the nature indicated, including a table of absorbent material, heating means embedded in said table, said table being adapted to be rotated in order to invert it, and porous media arranged upon the working surface of said table.

9. An apparatus of the nature indicated, including a table made of absorbent material, heating means embedded in said table, and an appropriately shaped frame arranged upon said table, said frame being provided with flexible ends and rigid sides and separate or loose end members arranged inside of said frame.

10. An apparatus of the nature indicated, including a table of absorbent material, heating means embedded in said table, said table being adapted to be rotated in order to invert it, a carrier and support for the sheet or product, and means provided on the table for detachably securing the carrier and support on either working surface of the table.

11. An apparatus of the nature indicated, including a table of absorbent material, heating means in the form of a flattened coil embedded in said table, means for permitting of the table being inverted, said means comprising trunnions provided at opposite sides of the table and bearings for said trunnions, the trunnions being of hollow construction and communicating with the flattened coil, means for introducing the heating medium into one trunnion and for withdrawing said medium from the other trunnion, porous media arranged on the working surface of the table, upon which media the material is moulded or formed, said porous media consisting of a sheet of canvas and a superimposed sheet of paper, an appropriately shaped frame arranged upon the table, said frame being provided with flexible ends and rigid sides and separate or loose end members arranged inside said frame, a carrier or support for the sheet or product, and means provided on the table for detachably securing the carrier or support on either working surface of the table.

Signed at Johannesburg South Africa this 14 day of June, 1925.

SAMUEL SCOTT WILSON.